(12) United States Patent
Wu et al.

(10) Patent No.: US 12,204,201 B2
(45) Date of Patent: Jan. 21, 2025

(54) DISPLAY PANEL COMPRISING A POLARIZING LAYER HAVING FIRST AND SECOND SUBLAYERS EACH HAVING A SHRINKAGE FORCE WITH A SHRINKAGE DIRECTION, METHOD OF MANUFACTURING A DISPLAY PANEL, AND DISPLAY DEVICE

(71) Applicant: SUZHOU CHINA STAR OPTOELECTRONICS TECHNOLOGY CO., LTD., Suzhou (CN)

(72) Inventors: Dazhao Wu, Suzhou (CN); Junfang Lv, Suzhou (CN); Junjie Li, Suzhou (CN); Dan Cao, Suzhou (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/308,717

(22) Filed: Apr. 28, 2023

(65) Prior Publication Data

US 2024/0255797 A1 Aug. 1, 2024

(30) Foreign Application Priority Data

Jan. 31, 2023 (CN) .......................... 202310071725.9

(51) Int. Cl.
*G02F 1/1335* (2006.01)
*G02F 1/13363* (2006.01)

(52) U.S. Cl.
CPC .. *G02F 1/133531* (2021.01); *G02F 1/133514* (2013.01); *G02F 1/13363* (2013.01)

(58) Field of Classification Search
CPC ................................................. G02F 1/133567
See application file for complete search history.

(56) References Cited

U.S. PATENT DOCUMENTS

| | | | |
|---|---|---|---|
| 2010/0073610 A1* | 3/2010 | Fukuda | G02F 1/133528 349/96 |
| 2010/0231830 A1* | 9/2010 | Hirakata | G02B 5/0242 349/96 |
| 2015/0168779 A1* | 6/2015 | Kim | G02F 1/133528 349/96 |

FOREIGN PATENT DOCUMENTS

| | | | | |
|---|---|---|---|---|
| JP | 2002006133 A | * | 1/2002 | ........... G02B 5/3033 |
| JP | 2016173581 A | * | 9/2016 | ............... B32B 7/02 |

* cited by examiner

*Primary Examiner* — Paul C Lee
(74) *Attorney, Agent, or Firm* — Nathan & Associates; Menachem Nathan (57) ABSTRACT

A display panel includes a first substrate, a second substrate, a liquid crystal layer, and a first polarizing layer disposed corresponding to the first substrate. The first polarizing layer includes a first sublayer, a second sublayer, and a first polarizing material layer disposed between the first sublayer and the second sublayer. The first sublayer has a first shrinkage force, the second sublayer has a second shrinkage force, and the shrinkage direction of the first shrinkage force is parallel to the shrinkage direction of the second shrinkage force.

12 Claims, 6 Drawing Sheets

DISPLAY PANEL COMPRISING A POLARIZING LAYER HAVING FIRST AND SECOND SUBLAYERS EACH HAVING A SHRINKAGE FORCE WITH A SHRINKAGE DIRECTION, METHOD OF MANUFACTURING A DISPLAY PANEL, AND DISPLAY DEVICE

CROSS-REFERENCE TO RELATED APPLICATION

This application claims priority to and the benefit of Chinese Patent Application No. 202310071725.9, filed on Jan. 31, 2023, the disclosure of which is incorporated herein by reference in its entirety.

TECHNICAL FIELD

The present disclosure relates to display technologies, and in particular, to display panels, methods of manufacturing a display panel, and display devices.

BACKGROUND

Liquid crystal display panels are widely used. However, as the thickness of the polarizing material layer of the display panel decreases, the strength of polarizing material layer may decrease. The stress applied by two film layers attached to the upper and lower sides of the polarizing material layer may cause wrinkles or even cracks in the polarizing material layer, and the higher the temperature, the higher the risk of cracking.

SUMMARY

In view of the above, an embodiment of the present disclosure provides a display panel including:
  a first substrate;
  a second substrate disposed opposite to the first substrate;
  a liquid crystal layer between the first substrate and the second substrate; and
  a first polarizing layer disposed at a side of the first substrate away from the second substrate, the first polarizing layer including a first sublayer, a second sublayer, and a first polarizing material layer disposed between the first sublayer and the second sublayer.

The first sublayer has a first shrinkage force, the second sublayer has a second shrinkage force, and the shrinkage direction of the first shrinkage force is parallel to the shrinkage direction of the second shrinkage force.

An embodiment of the present disclosure further provides a method of manufacturing a display panel, including:
  providing a first sublayer having a first shrinkage force, a second sublayer having a second shrinkage force, and a first polarizing material layer;
  sequentially attaching the second sublayer and the first sublayer to the first polarizing material layer to form a first polarizing layer, so that the first polarizing material layer is sandwiched between the first sublayer and the second sublayer, and a shrinkage direction of the first shrinkage force is parallel to a shrinkage direction of the second shrinkage force;
  providing a first substrate, a second substrate disposed opposite to the first substrate, and a liquid crystal layer between the first substrate and the second substrate; and
  attaching the first polarizing layer to a side of the first substrate away from the second substrate.

An embodiment of the present disclosure also provides a display device including a display panel as described above and a backlight module.

DETAILED DESCRIPTION

Some embodiments of the present disclosure will be described in detail below in conjunction with the drawings. It should be understood that the described embodiments are only to illustrate and explain the present disclosure, but not intended to limit the present disclosure.

In the present disclosure, unless otherwise stated, locative words used such as "upper" and "lower" generally refer to the upper and lower directions of the device in actual use or working state, and specifically refer to the drawing directions in the drawings; and "inner" and "outer" refer to the outline of the device.

In recent years, the liquid crystal display panel still occupies a position in the consumer market, but as the thickness of the polarizing material layer decreases, its strength decreases, and the stress applied by the two film layers attached to the upper and lower sides of the polarizing material layer may cause wrinkles or even cracks in the polarizing material layer, and the higher the temperature, the higher the risk of cracking.

Figure 1:
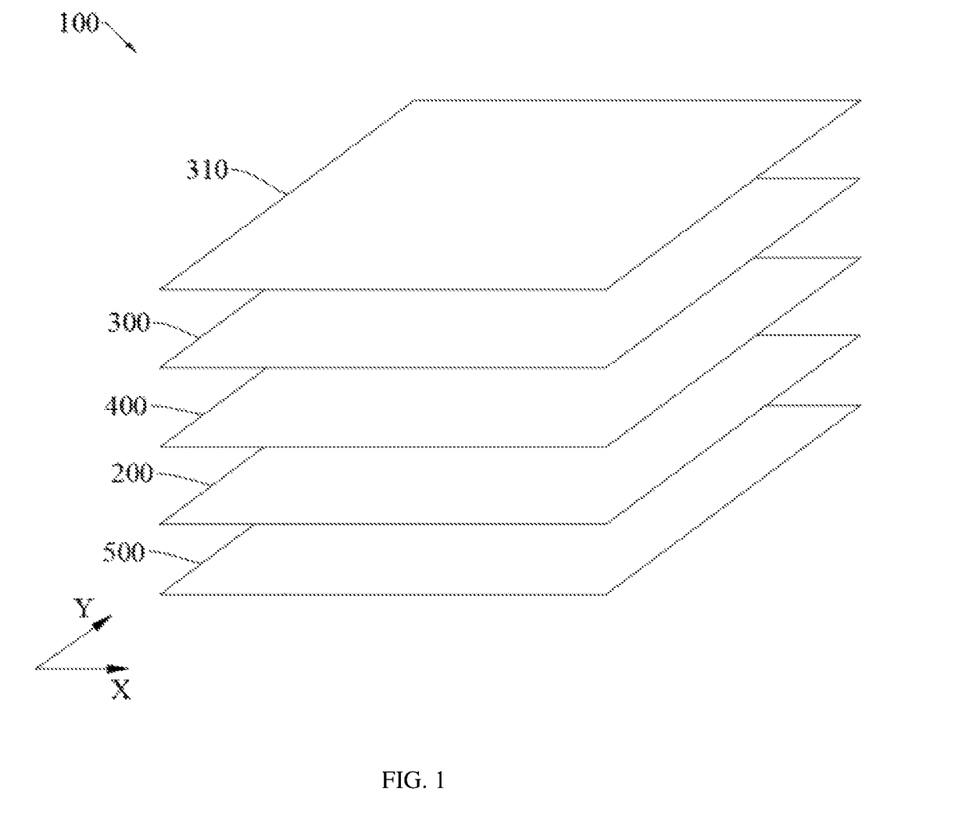
FIG. 1 is a schematic structural diagram of a first structure of a display panel according to an embodiment of the present disclosure.
Figure 2:
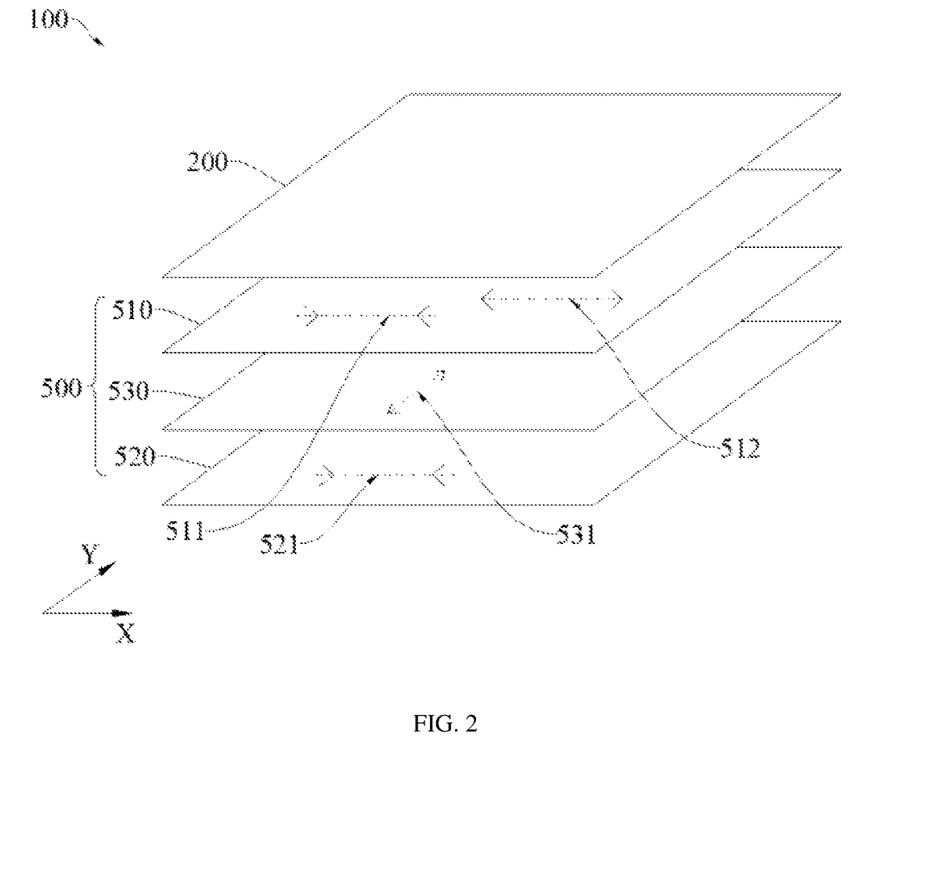
FIG. 2 is a schematic partial structural diagram of a second structure of a display panel according to an embodiment of the present disclosure.
Figure 3:
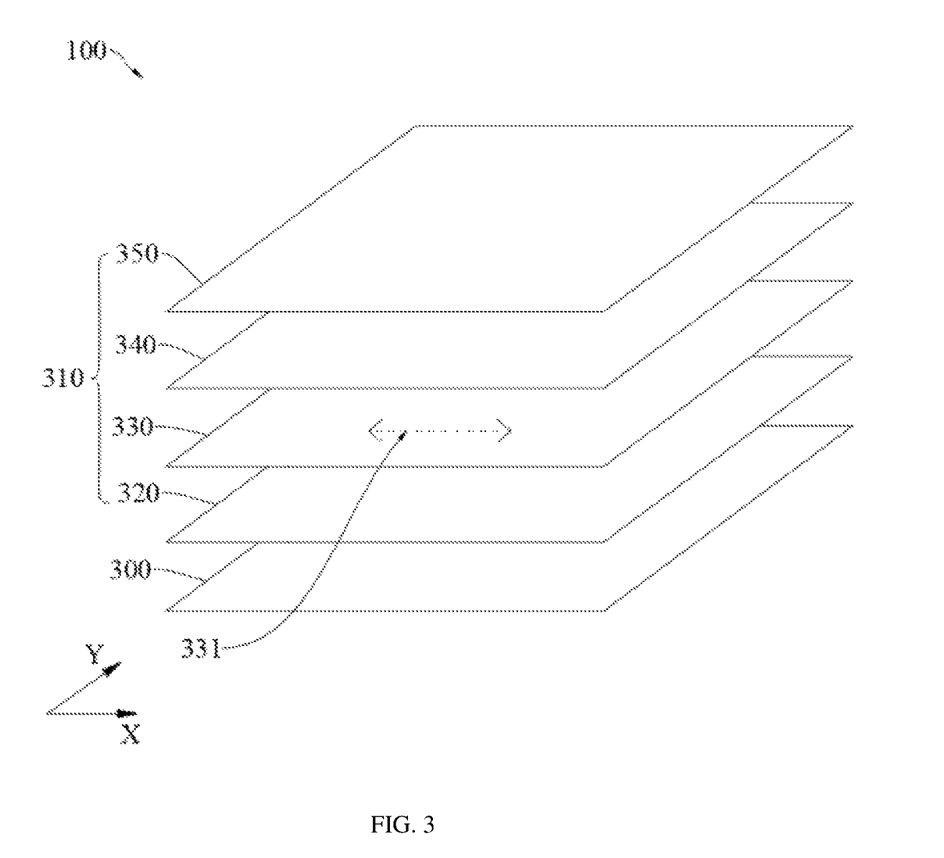
FIG. 3 is a schematic partial structural diagram of a third structure of a display panel according to an embodiment of the present disclosure.

Referring to FIGS. 1 to 3, an embodiment of the present disclosure provides a display panel 100 including:
  a first substrate 200;
  a second substrate 300 disposed opposite to the first substrate 200;
  a liquid crystal layer 400 between the first substrate 200 and the second substrate 300; and
  a first polarizing layer 500 disposed to correspond to the first substrate 200, the first polarizing layer 500 includes a first sublayer 510, a second sublayer 520, and a first polarizing material layer 530 disposed between the first sublayer 510 and the second sublayer 520.

The first sublayer 510 has a first shrinkage force 511 and the second sublayer 520 has a second shrinkage force 521, and the shrinkage direction of the first shrinkage force 511 is parallel to the shrinkage direction of the second shrinkage force 521.

According to the present disclosure, the shrinkage forces of the first sublayer and the second sublayer on both sides of the first polarizing material layer are set to be parallel to each other, which reduces the difference in the directions of the shrinkage stresses of the first sublayer and the second sublayer on both sides of the first polarizing material layer, reduces the stress pulling caused by the shrinkage stresses in different directions on both sides of the first polarizing material layer, reduces the risk that the polarizing material layer is prone to wrinkles or even cracks, and improves the quality of the first polarizing layer and the display quality of the display panel.

The technical solution of the present disclosure will now be described in connection with specific embodiments.

In an embodiment, referring to FIG. 1 and FIG. 2, the display panel 100 includes the first substrate 200, the second substrate 300 disposed opposite to the first substrate 200, the liquid crystal layer 400 disposed between the first substrate 200 and the second substrate 300, and the first polarizing layer 500 disposed corresponding to the first substrate 200. The first polarizing layer 500 includes the first sublayer 510, the second sublayer 520, and the first polarizing material layer 530 disposed between the first sublayer 510 and the second sublayer 520. The first sublayer 510 has a first shrinkage force 511 and the second sublayer 520 has a second shrinkage force 521, and the shrinkage direction of the first shrinkage force 511 is parallel to the shrinkage direction of the second shrinkage force 521.

For ease of description, a first direction herein is parallel to the X-axis and a second direction is parallel to the Y-axis. The first sublayer 510 and the second sublayer 520 are generally organic material films. As the temperature increases, the shrinkage force increases, and the influence on the first polarizing layer 500 becomes stronger and stronger. Therefore, the directions of the shrinkage forces of the first sublayer 510 and the second sublayer 520 are parallel to each other, which is conducive to offsetting the shrinkage stresses on both sides of the first polarizing layer 500, reducing the difference in the directions of the shrinkage stresses applied by the first sublayer 510 and the second sublayer 520 on both sides of the first polarizing layer 530, reducing the stress pulling caused by the shrinkage stresses in different directions on both sides of the first polarizing layer 530, reducing the risk of wrinkling or even crack of the polarizing layer, improving the quality of the first polarizing layer 500, improving the production efficiency, and improving the display quality of the display panel 100.

In some embodiments, the ratio of the first shrinkage force 511 to the second shrinkage force 521 is from 19/20 to 21/20.

The shrinkage direction of the first shrinkage force 511 is parallel to the shrinkage direction of the second shrinkage force 521, and the magnitude of the first shrinkage force 511 is set to be consistent with the magnitude of the second shrinkage force 521, thereby further reducing the difference in the directions of the shrinkage stresses applied by the first sublayer 510 and the second sublayer 520 on both sides of the first polarizing layer 530, reducing the stress pulling caused by the shrinkage stresses in different directions on both sides of the first polarizing layer 530, reducing the risk of wrinkling or even crack of the polarizing layer, improving the quality of the first polarizing layer 500, and improving the display quality of the display panel 100.

In some embodiments, referring to FIG. 2, the first sublayer 510 is an optical compensation film, the first sublayer 510 has a slow axis 512, and the direction of the slow axis 512 of the first sublayer 510 is perpendicular to the direction of the absorption axis of the first polarizing material layer 530; the direction of the slow axis 512 of the first sublayer 510 is parallel to the direction of the first shrinkage force 511. The absorption axis of the first polarizing material layer 530 is denoted by the reference numeral 531.

The display panel 100 may be of an In-Plane Switching (IPS) or Vertical Alignment (VA) mode, for example. The slow axis 512 of the optical compensation film may compensate for side light leakage, improve a large viewing angle display effect, and the effect is more obvious for the VA mode. The direction of the slow axis 512 of the first sublayer 510 is perpendicular to the direction of the absorption axis of the first polarizing material layer 530, and it is further advantageous to improve a large viewing angle display effect.

Figure 5:
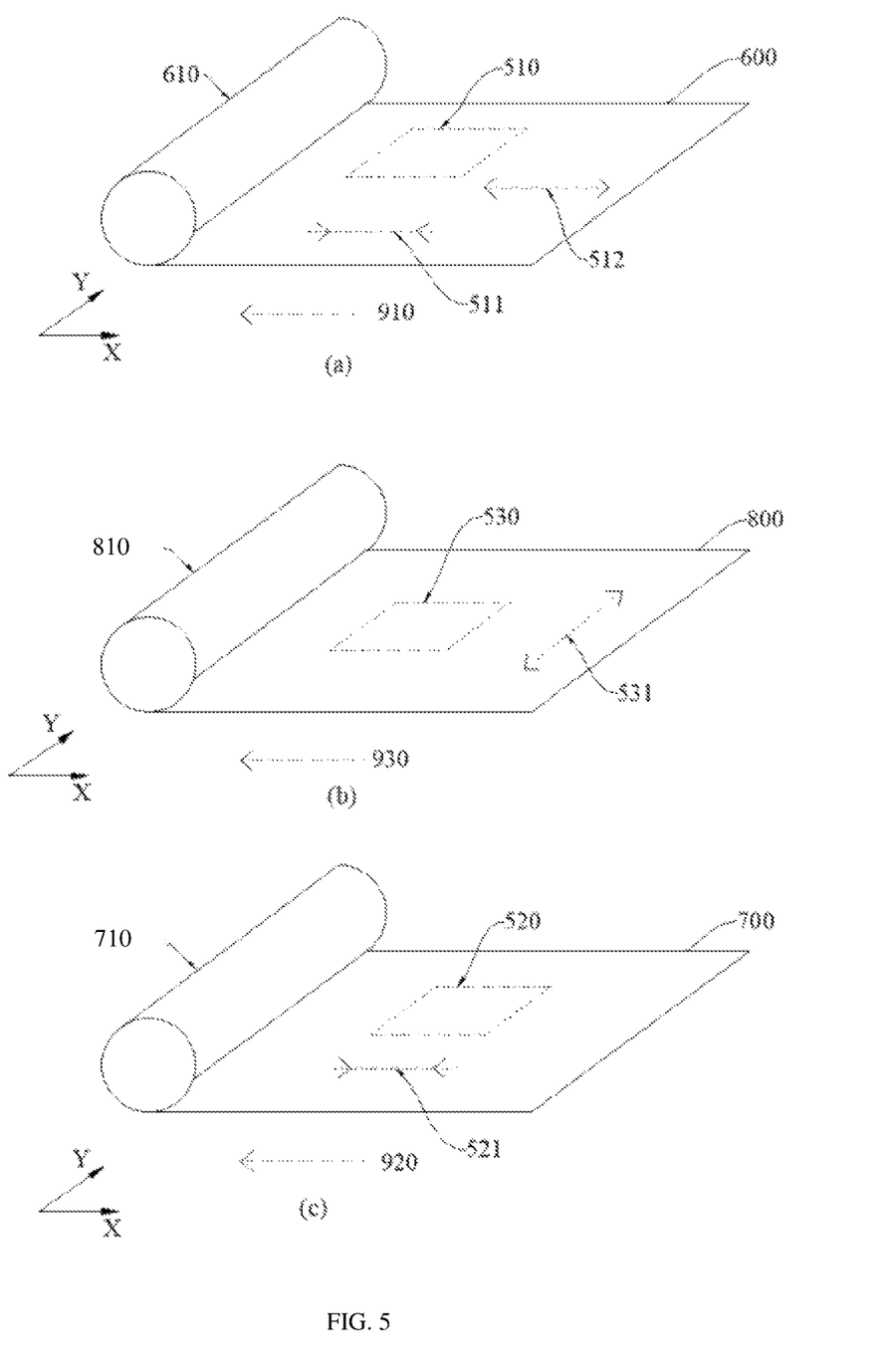
FIG. 5 is a schematic flowchart of a method of manufacturing a display panel according to an embodiment of the present disclosure.

When making the first sublayer 510, referring to illustration (a) of FIG. 5, a first material sublayer 600 is provided, the first material sublayer 600 is stretched to form a first shrinkage force 511, the first material sublayer 600 is curled to form a first coil 610, the unfolding direction of the first coil 610 is parallel to the first direction, the first coil 610 is unfolded and cut to provide the first sublayer 510, and the direction of the slow axis 512 of the first sublayer 510 is parallel to the direction of the first shrinkage force 511, so that the influence of the first shrinkage force 511 on the axial direction of the slow axis 512 is reduced during the shrinkage, the optical effect of the first sublayer 510 is ensured, and the large viewing angle display effect is improved.

In some embodiments, referring to FIG. 2, the first substrate 200 is an array substrate, and the second substrate 300 is a color filter substrate; the first polarizing layer 500 is disposed at the side of the array substrate away from the color filter substrate, the second sublayer 520 is disposed at the side of the first sublayer 510 away from the array substrate, and the second sublayer 520 is a protective layer.

Generally, a coil of a polarizing layer at the side of a color filter substrate has a unfolding direction parallel to the direction of the absorption axis, and the polarizing layer at the side of the array substrate and the polarizing layer at the side of the color filter substrate are both formed by unfolding a coil of the same type, so that the direction of the absorption axis of the polarizing layer at the side of the array substrate is parallel to the unfolding direction of the coil, and the length of the polarizing layer at the side of the array substrate is the width of the coil. Therefore, a factor limiting the size of the polarizing layer at the side of the array substrate is the width of the coil.

Generally, a surface treatment layer 350 is also provided on the protective layer at the side of the color filter substrate, so that the protective layer at the side of the color filter substrate has less influence on the polarizing layer, and the protective layer at the side of the array substrate has more influence on the polarizing layer.

In manufacturing the second sublayer 520, referring to illustration (c) of FIG. 5, a second material sublayer 700 is provided, the second material sublayer 700 is stretched to form the second shrinkage force 521, the second material sublayer 700 is curled to form a second coil 710, an unfolding direction of the second coil 710 is parallel to the first direction, the second coil 710 is unfolded and cut to provide the second sublayer 520, and the direction of the second shrinkage force 521 of the second sublayer 520 is parallel to the unfolding direction of the second coil 710, so that the influence of the unfolding of the second coil 710 on the direction perpendicular to the second shrinkage force 521 is reduced, the change of the shrinkage direction of the second shrinkage force 521 of the second sublayer 520, which affects the matching effect with the first sub-layer 510, is avoided, the risk of wrinkling or even breaking of the polarizing material layer is reduced, the quality of the first polarizing layer 500 is improved, and the display quality of the display panel 100 is improved.

In some embodiments, the first sublayer 510 is an optical compensation layer, the first sublayer 510 has an in-plane phase difference of less than or equal to 65 nm, and the first sublayer 510 has an in-vertical-plane phase difference of 5 nm to 280 nm.

The first sublayer 510 is the optical compensation layer. Generally, the larger the in-plane phase difference and the in-vertical-plane phase difference of the optical film layer are, the larger the shrinkage force is. The in-plane phase difference Re of the first sublayer 510 is in the range of 0 nm to 65 nm. The in-vertical-plane phase difference Rth of the first sublayer 510 is in the range of 5 nm to 280 nm. Therefore, it is avoided that the phase difference is too large, resulting in excessive shrinkage force, and that the shrinkage pull stress applied by the first sublayer 510 on the first polarizing material layer 530 is too large, which cause that the second shrinkage force 521 of the second sublayer 520 cannot balance the first shrinkage force 511. The risk that the polarizing material layer may be wrinkled or even broken is reduced, and the quality of the first polarizing layer 500 is improved. At the same time, a suitable in-vertical-plane phase difference Rth and the in-plane phase difference Re are beneficial to improving the visual viewing-angle and improving the display quality of the display panel 100.

Alternatively, the in-plane phase difference Re and the in-vertical-plane phase difference Rth (the phase difference Rth in the thickness direction) of the optical film are measured using a birefringence evaluation device (for example, KOBRA-WPR, manufactured by Prince Metering Machine Co., Ltd.). The optical film layer is attached to glass to obtain a sample for measuring the phase difference, and the phase difference at a wavelength of 550 nm may be measured. The visible light has a wavelength of 380 nm to 780 nm, the control of the optical film layer may be carried out according to a phase difference at a wavelength of 550 nm.

In some embodiments, at 80° C., the shrinkage force of the first sublayer 510 is less than or equal to 4N, and the shrinkage force of the second sublayer 520 is less than or equal to 4N.

Generally, before the display panel 100 is manufactured, for example, a weatherability test of about 50° C. is required. At 80° C., the shrinkage force of the first sublayer 510 is less than or equal to 4N, and the shrinkage force of the second sublayer 520 is less than or equal to 4N, so that it may be avoided that the shrinkage force is too large, and the second shrinkage force 521 of the second sublayer 520 may not balance the first shrinkage force 511, thereby reducing the risk that the polarizing material layer tends to be wrinkled or even broken, improving the quality of the first polarizing layer 500, and in particular, improving the high weatherability of the first polarizing layer 500, and improving the display quality of the display panel 100.

Alternatively, the measurement of the shrinkage force may be carried out through a thermal shrinkage force measurement using the thermomechanical measuring device (TMA/SS6000) from Seiko Instruments. A sample with a sample width of 4 mm and a sample length of 70 mm is cut out in the direction in which the shrinkage force is to be tested; the sample is fixed to both ends of a clamp with a chuck pitch of 20 mm; optionally, the temperature is raised from 25° C. (room temperature) to the test temperature (e.g., 80° C., 90° C.) at a temperature increasing rate 10° C./min, the shrinkage force of the sample at a constant length state is tracked, and the shrinkage force at the test temperature of the sample is evaluated.

For the direction of the shrinkage force, if the sample has a shrinkage force value measured, there is a shrinkage force in a direction parallel to the line connecting the two ends of the clamp; if the value of the measured shrinkage force of the sample is very small or substantially zero, there is substantially no shrinkage force in the direction parallel to the line connecting the two ends of the clamp, or the direction parallel to the line connecting the two ends of the clamp is perpendicular to the direction of the shrinkage force; samples in different directions may be selected for measurement, and the direction in which the maximum shrinkage force is measured may be the direction in which the shrinkage forces are combined.

In some embodiments, referring to FIGS. 1 and 3, the display panel 100 further includes a second polarizing layer 310 at a side of the second substrate 300, the second polarizing layer 310 includes a third sublayer 320, a fourth sublayer 340, and a second polarizing material layer 330 between the third sublayer 320 and the fourth sublayer 340.

The fourth sublayer 340 is located at the side of the third sublayer 320 away from the first substrate 200, and the third sublayer 320 may be an optical compensation film having a slow axis, and the fourth sublayer 340 may be a protective layer. For structure and property parameters of the third sublayer 320 and the fourth sublayer 340, reference may be made to the structure and property parameters of the first sublayer 510 and the second sublayer 520, and details are not described herein.

In some embodiments, referring to FIGS. 2 and 3, the absorption axis of the second polarizing material layer 330 is perpendicular to the absorption axis of the first polarizing material layer 530. The absorption axis of the second polarizing material layer 330 is denoted by the reference numeral "331".

In some embodiments, referring to FIG. 3, the second polarizing layer 310 further includes a surface treatment layer 350 at the side of the fourth sublayer 340 away from the first substrate 200, and the surface treatment layer 350 may be used for functions such as hardening or anti-glare.

In some embodiments, the materials of the first polarizing material layer 530 and the second polarizing material layer 330 may include polyvinyl alcohol (PVA). The thickness of each of the first polarizing material layer 530 and the second polarizing material layer 330 is less than or equal to 5 μm.

In some embodiments, the materials of the first sublayer 510 and the third sublayer 320 may be polymeric materials such as cycloolefin polymer (COP) or triacetate fiber film (TAC). The thickness of each of the first sublayer 510 and the third sublayer 320 ranges from 30 μm to 60 μm.

In some embodiments, the materials of the second sublayer 520 and the fourth sublayer 340 may be triacetate fiber film (TAC) or low water absorption material such as cycloolefin polymer (COP), polymethylmethacrylate (PMMA), polyethylene terephthalate (PET), and the like. The thickness of each of the second sublayer 520 and the fourth sublayer 340 ranges from 40 μm to 100 μm.

In some embodiments, an adhesive layer is further provided between the first polarizing layer 500 and the first substrate 200, and an adhesive layer is further provided between the second polarizing layer 310 and the second substrate 300.

In some embodiments, the array substrate includes a first substrate, an active layer on the first substrate, a first insulating layer on the active layer, a gate layer on the first insulating layer, a second insulating layer on the gate layer, a source-drain layer on the second insulating layer, and a third insulating layer on the source-drain layer.

In some embodiments, the color filter substrate includes a second substrate and a color filter layer. The color filter layer includes a plurality of color filter and light shielding parts positioned between the two adjacent color resistances.

In some embodiments, the display panel 100 further includes a pixel electrode layer and a common electrode layer, and the specific setting positions thereof may be adaptively set according to different modes, which is not specifically limited herein.

According to the present disclosure, the shrinkage forces of the first sublayer and the second sublayer on both sides of the first polarizing material layer are set to be parallel to each other, so that the direction difference between the shrinkage stresses of the first sublayer and the second sublayer on both sides of the first polarizing material layer is reduced, the stress pulling caused by the shrinkage stresses in different directions on both sides of the first polarizing material layer is reduced, the risk that the polarizing material layer is prone to wrinkles or even cracks is reduced, the quality of the first polarizing layer is improved, and the display quality of the display panel is improved.

Figure 4:
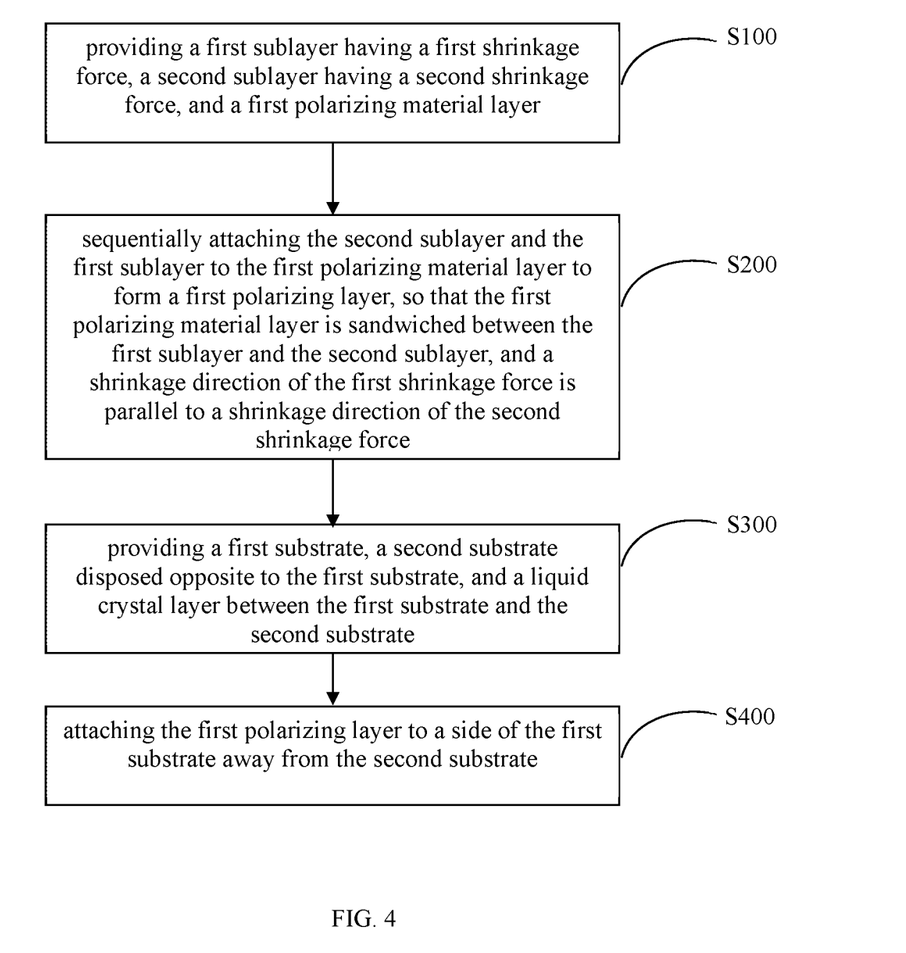
FIG. 4 is a flowchart of a method of manufacturing a display panel according to an embodiment of the present disclosure.

Referring to FIG. 4, an embodiment of the present disclosure further provides a method of manufacturing the display panel 100, which includes the following steps.

At step S100, a first sublayer 510 having a first shrinkage force 511, a second sublayer 520 having a second shrinkage force 521, and a first polarizing material layer 530 are provided;

At step S200, the second sub-layer 520 and the first sub-layer 510 are attached sequentially to the first polarizing material layer 530, so that a shrinkage direction of the first shrinkage force 511 is parallel to a shrinkage direction of the second shrinkage force 521, and the first polarizing layer 500 is formed;

At step S300, a first substrate 200, a second substrate 300 disposed opposite to the first substrate 200, and a liquid crystal layer 400 between the first substrate 200 and the second substrate 300 are provided;

At step S400, the first polarizing layer 500 is attached to the first substrate 200 at a side away from the second substrate 300.

According to the present disclosure, the shrinkage forces of the first sublayer and the second sublayer on both sides of the first polarizing material layer are set to be parallel to each other, so that the direction difference between the shrinkage stresses of the first sublayer and the second sublayer on both sides of the first polarizing material layer is reduced, the stress pulling caused by the shrinkage stresses in different directions on both sides of the first polarizing material layer is reduced, the risk that the polarizing material layer is prone to wrinkles or even cracks is reduced, the quality of the first polarizing layer is improved, and the display quality of the display panel is improved.

The technical solution of the present disclosure will now be described in connection with specific embodiments.

In the embodiment, the method of manufacturing the display panel 100 includes the following step.

At step S100, a first sublayer 510 having a first shrinkage force 511, a second sublayer 520 having a second shrinkage force 521, and a first polarizing material layer 530 are provided, as shown in FIG. 5.

In some embodiments, the step S100 includes the following steps.

At step S110, the first material sublayer 600 is provided, the first material sublayer 600 is stretched to form a first shrinkage force 511, and a shrinkage direction of the first shrinkage force 511 is parallel to a first direction, as shown in illustration (a) of FIG. 5.

At step S120, the first material sublayer 600 is curled to form a first coil 610 so that an unfolding direction of the first coil 610 is parallel to the first direction, and the first coil 610 is unfolded and cut to provide the first sublayer 510, as shown in illustration (a) of FIG. 5.

At step S130, the second material sublayer 700 is provided, the second material sublayer 700 is stretched to form a second shrinkage force 521, and a shrinkage direction of the second shrinkage force 521 is parallel to the first direction, as shown in illustration (c) of FIG. 5.

At step S140, the second material sublayer 700 is curled to form a second coil 710 so that an unfolding direction of the second coil 710 is parallel to the first direction, and the second coil 710 is unfolded and cut to provide the second sublayer 520, as shown in illustration (c) of FIG. 5.

In some embodiments, referring to the illustration (c) of FIG. 5, when the first sublayer 510 is formed, the first material sublayer 600 is provided, the first material sublayer 600 is stretched to form the first shrinkage force 511, the first material sublayer 600 is curled to form the first coil 610, the unfolding direction of the first coil 610 is parallel to the first direction, the first coil 610 is unfolded and cut to provide the first sublayer 510, and the direction of the slow axis 512 of the first sublayer 510 is parallel to the direction of the first shrinkage force 511, so that the influence of the first shrinkage force 511 on the axial direction of the slow axis 512 during the shrinkage is reduced, the optical effect of the first sublayer 510 is ensured, and the large viewing-angle display effect is improved. The unfolding direction of the first coil 610 is denoted by the reference numeral "910", and the unfolding direction of the second coil 710 is denoted by the reference numeral "920".

Generally, a coli of the polarizing layer at the side of the color filter substrate has an unfolding direction parallel to the direction of the absorption axis, and the polarizing layer at the side of the array substrate and the polarizing layer at the side of the color filter substrate are both formed by unfolding a coil of the same type, so that the direction of the absorption axis of the polarizing layer at the side of the array substrate is parallel to the unfolding direction of the coil, and the length of the polarizing layer at the side of the array substrate is the width of the coil. Therefore, a factor limiting the size of the polarizing layer at the side of the array substrate is the width of the coil.

Generally, the protective layer at the side of the color filter substrate is provided with the surface treatment layer 350, so that the protective layer at the side of the color filter substrate has less influence on the polarizing layer, and the protective layer at the side of the array substrate has more influence on the polarizing layer.

In manufacturing the second sublayer 520, referring to illustration (c) of FIG. 5, the second material sublayer 700 is provided, the second material sublayer 700 is stretched to form the second shrinkage force 521, the second material sublayer 700 is curled to form the second coil 710, the unfolding direction of the second coil 710 is parallel to the first direction, the second coil 710 is unfolded and cut to provide the second sublayer 520, and the direction of the second shrinkage force 521 of the second sublayer 520 is parallel to the unfolding direction of the second coil 710, so that the influence of the unfolding of the second coil 710 on the direction perpendicular to the second shrinkage force 521 is reduced, the change of the shrinkage direction of the second shrinkage force 521 of the second sublayer 520, which affects the matching effect with the first sub-layer 510, is avoided, the risk of wrinkling or even cracking of the polarizing material layer is reduced, the quality of the first polarizing layer 500 is improved, and the display quality of the display panel 100 is improved.

At step S150, the first polarizing material layer 530 is provided.

In some embodiments, the first substrate 200 is the array substrate, and the second substrate 300 is a color filter substrate, and the step S150 includes the following steps.

At step S151, a first polarizing material film 800 is provided, the direction of the absorption axis of the first polarizing material film 800 is parallel to the second direction, as shown in illustration (b) of FIG. 5.

At step S152, the first polarizing material film 800 is curled to form a third coil 810, so that the unfolding direction of the third coil 810 is parallel to the first direction, and the third web 810 is unfolded and cut to provide the first polarizing material layer 530. The unfolding direction of the third coil 810 is indicated by the reference numeral "930", as shown in illustration (b) of FIG. 5.

In some embodiments, the first direction is perpendicular to the second direction. The length of the polarizing layer at the side of the array substrate is limited by the length of the coil, and the width of the polarizing layer at the side of the array substrate is limited by the width of the coil, which is conducive to the manufacture of a larger size polarizing layer at the side of the array substrate and a larger size display panel.

In some embodiments, the polarization of the first polarizing material layer 530 may be performed before it is attached to the second protective layer, and step S151 includes the following steps.

At step S1511, the first polarizing material film 800 including polyvinyl alcohol (PVA) is provided.

At step S1512, the first polarizing material film 800 is polarized so that the direction of the absorption axis of the first polarizing material film 800 is parallel to the second direction.

In some embodiments, the polarizing method may be an iodine staining method.

At step S200, the second sublayer 520 and the first sublayer 510 are sequentially attached to the first polarizing material layer 530 so that the shrinkage direction of the first shrinkage force 511 is parallel to the shrinkage direction of the second shrinkage force 521, so as to form the first polarizing layer 500, as shown in FIG. 2.

In some embodiments, the polarization of the first polarizing material layer 530 may be performed after it is attached with the second protective layer, the step S200 includes the following steps.

At step S210, the first polarizing material layer 530 is attached with the second sublayer 520.

At step S220, the first polarizing material layer 530 is polarized so that the direction of the absorption axis of the first polarizing material layer 530 is parallel to the second direction.

At step S230, the first polarizing material layer 530 is attached with the first sublayer 510 so that the shrinkage direction of the first shrinkage force 511 is parallel to the shrinkage direction of the second shrinkage force 521, so as to form the first polarizing layer 500.

In some embodiments, the polarizing method may be an iodine staining method.

In some embodiments, the polarization of the first polarizing material layer 530 may be performed after it is attached with the second protective layer, the material of the second sublayer 520 needs to be a low water absorption material, such as cycloolefin polymer (COP), polymethylmethacrylate (PMMA), polyethylene terephthalate (PET), and the like.

In some embodiments, the first sublayer 510 may be obtained by uniaxial stretching or biaxial stretching, or performing uniaxial stretching and biaxial stretching sequentially.

At step S300, the first substrate 200, the second substrate 300 disposed opposite to the first substrate 200, and the liquid crystal layer 400 between the first substrate 200 and the second substrate 300 are provided, as shown in FIG. 1.

In some embodiments, the first substrate 200 is an array substrate and the second substrate 300 is a color filter substrate. The first polarizing layer 500 is disposed at the side of the array substrate away from the color filter substrate, the second sublayer 520 is disposed at the side of the first sublayer 510 away from the array substrate, and the second sublayer 520 is the protective layer.

At step S400, the first polarizing layer 500 is attached to a side of the first substrate 200 away from the second substrate 300, as shown in FIG. 1.

In some embodiments, the method of manufacturing the display panel 100 further includes the following steps.

At step S500, the second polarizing layer 310 is provided, as shown in FIG. 3.

At step S600, the second polarizing layer 310 is attached to the side of the second substrate 300 away from the first substrate 200, as showing in FIG. 1.

In some embodiments, referring to FIG. 3, the display panel 100 further includes the second polarizing layer 310 at the side of the second substrate 300, the second polarizing layer 310 includes the third sublayer 320, the fourth sublayer 340, and the second polarizing material layer 330 between the third sublayer 320 and the fourth sublayer 340.

The fourth sublayer 340 is located at the side of the third sublayer 320 away from the first substrate 200. The third sublayer 320 may be an optical compensation film having a slow axis. The fourth sublayer 340 may be a protective layer. For the structure and property parameters of the third sublayer 320 and the fourth sublayer 340, reference may be made to the structure and property parameters of the first sublayer 510 and the second sublayer 520. Details are not described herein.

According to the present disclosure, the shrinkage forces of the first sublayer and the second sublayer on both sides of the first polarizing material layer are set to be parallel to each other, so that the direction difference between the shrinkage stresses of the first sublayer and the second sublayer on both sides of the first polarizing material layer is reduced, the stress pulling caused by the shrinkage stresses in different directions on both sides of the first polarizing material layer is reduced, the risk that the polarizing material layer is prone to wrinkles or even cracks is reduced, the quality of the first polarizing layer is improved, and the display quality of the display panel is improved.

Figure 6:
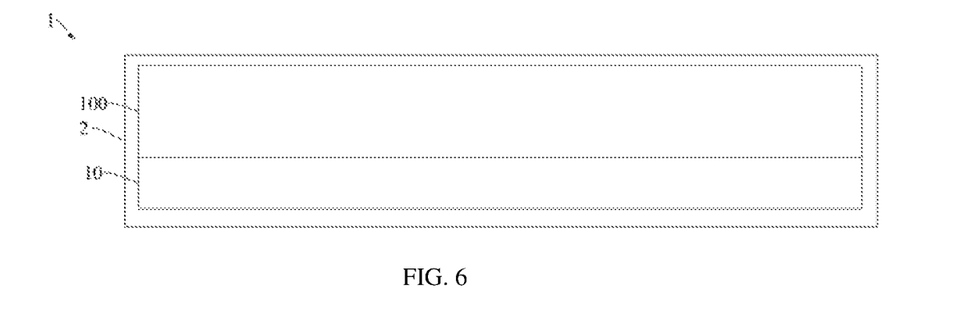
FIG. 6 is a schematic structural diagram of a display device according to an embodiment of the present disclosure.
Figure 7:
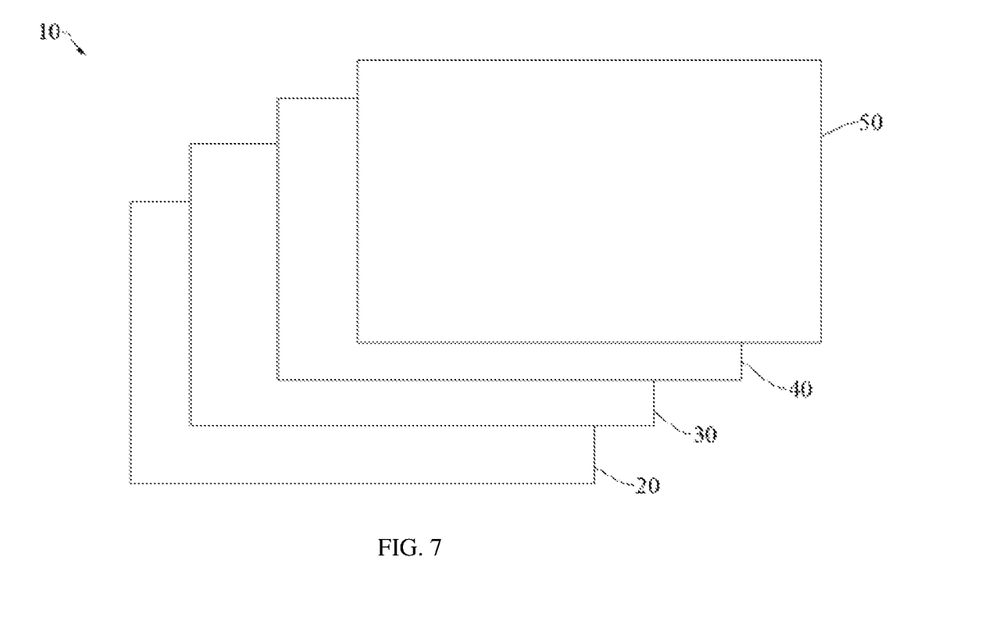
FIG. 7 is a schematic structural diagram of a backlight module of a display device according to an embodiment of the present disclosure.

Referring to FIGS. 6 and 7, an embodiment of the present disclosure further provides a display device 1 including the display panel 100 and a backlight module 10 as described above.

Referring to FIG. 7, the backlight module 10 includes a lamp plate 30, a back plate 20, and a diffusion plate 40; the lamp plate 30 is disposed between the back plate 20 and the diffusion plate 40.

Specifically, the lamp plate 30 in the present embodiment is fixed to the back plate 20, and the fixing may be a bolt fixing or an adhesive fixing, which is not difficult for a person skilled in the art to realize, and will not be repeatedly described herein. After the lamp plate 30 is fixed to the back plate 20, the diffusion plate 40 is disposed at a side of the lamp plate 30 facing away from the back plate 20, and an optical film 50 is disposed at a side of the diffusion plate 40 facing away from the back plate 20. The arrangement of the diffusion plate 40 and the optical film 50 is not difficult to be realized or understood by a person skilled in the art, and details are not described herein.

Referring to FIG. 6, in some embodiments, the display device 1 further includes a device body 2 that is integrated with the backlight module 10 and the display panel 100.

In some embodiments, the device main body 2 may include a middle frame, a frame glue, or the like, and the display device 1 may be a display terminal such as a mobile phone, a tablet, a television, an electronic watch, a sport bracelet, a notebook computer, a giant screen, or the like, which is not limited herein.

An embodiment of the present disclosure provides a display panel, a manufacturing method thereof, and a display device. The display panel includes a first substrate, a second substrate, a liquid crystal layer, and a first polarizing layer disposed corresponding to the first substrate. The first polarizing layer includes a first sublayer, a second sublayer, and a first polarizing material layer disposed between the first sublayer and the second sublayer. The first sublayer has a first shrinkage force, the second sublayer has a second shrinkage force, and a shrinkage direction of the first shrinkage force is parallel to a shrinkage direction of the second shrinkage force. According to the present disclosure, the shrinkage forces of the first sublayer and the second sublayer on both sides of the first polarizing material layer are set to be parallel to each other, so that the direction difference between the shrinkage stresses of the first sublayer and the second sublayer on both sides of the first polarizing material layer is reduced, the stress pulling caused by the shrinkage stresses in different directions on both sides of the first polarizing material layer is reduced, the risk that the polarizing material layer is prone to wrinkles or even cracks is reduced, the quality of the first polarizing layer is improved, and the display quality of the display panel is improved.

The present disclosure has been described in detail with respect to a display panel, a method for manufacturing the same, and a display device according to an embodiment of the present disclosure. The principles and implementations of the present disclosure are described in detail here with specific examples. The above description of the embodiments is merely intended to help understand the method and core ideas of the present application. At the same time, a person skilled in the art may make changes in the specific embodiments and application scope according to the idea of the present application. In conclusion, the content of the present specification should not be construed as a limitation to the present disclosure.

What is claimed is:

1. A display panel, comprising:
    a first substrate;
    a second substrate disposed opposite to the first substrate;
    a liquid crystal layer between the first substrate and the second substrate; and
    a first polarizing layer disposed at a side of the first substrate away from the second substrate, the first polarizing layer comprising a first sublayer, a second sublayer, and a first polarizing material layer disposed between the first sublayer and the second sublayer,
    wherein the first sublayer has a first shrinkage force, the second sublayer has a second shrinkage force, and a shrinkage direction of the first shrinkage force is parallel to a shrinkage direction of the second shrinkage force,
    wherein the shrinkage direction of the first shrinkage force and the shrinkage direction of the second shrinkage force are perpendicular to a direction of an absorption axis of the first polarizing material layer,
    the first sublayer is an optical compensation film and has a slow axis in a direction perpendicular to the direction of the absorption axis of the first polarizing material layer;
    wherein the direction of the slow axis of the first sublayer is parallel to the shrinkage direction of the first shrinkage force, and
    wherein at 80° C., the first shrinkage force of the first sublayer is less than or equal to 4 N and the second shrinkage force of the second sublayer is less than or equal to 4 N.

2. The display panel according to claim 1, wherein a ratio of the first shrinkage force to the second shrinkage force ranges from 19/20 to 21/20.

3. The display panel according to claim 2, wherein the first substrate is an array substrate and the second substrate is a color filter substrate; and
    the second sublayer is a protective layer disposed at a side of the first sublayer away from the array substrate.

4. The display panel according to claim 1, wherein the first substrate is an array substrate and the second substrate is a color filter substrate; and
    the second sublayer is a protective layer disposed at a side of the first sublayer away from the array substrate.

5. The display panel according to claim 1, wherein an in-plane phase difference of the first sublayer is less than or equal to 65 nm, and an in-vertical-plane phase difference of the first sublayer ranges from 5 nm to 280 nm.

6. A method of manufacturing a display panel, comprising:
    providing a first sublayer having a first shrinkage force, a second sublayer having a second shrinkage force, and a first polarizing material layer;
    sequentially attaching the second sublayer and the first sublayer to the first polarizing material layer to form a first polarizing layer, so that the first polarizing material layer is sandwiched between the first sublayer and the second sublayer, and a shrinkage direction of the first shrinkage force is parallel to a shrinkage direction of the second shrinkage force;
    providing a first substrate, a second substrate disposed opposite to the first substrate, and a liquid crystal layer between the first substrate and the second substrate; and
    attaching the first polarizing layer to a side of the first substrate away from the second substrate,
    wherein the shrinkage direction of the first shrinkage force and the shrinkage direction of the second shrinkage force are perpendicular to a direction of an absorption axis of the first polarizing material layer,
    the first sublayer is an optical compensation film and has a slow axis in a direction perpendicular to the direction of the absorption axis of the first polarizing material layer;
    wherein the direction of the slow axis of the first sublayer is parallel to the shrinkage direction of the first shrinkage force, and wherein at 80° C., the first shrinkage force of the first sublayer is less than or equal to 4 N and the second shrinkage force of the second sublayer is less than or equal to 4 N.

7. The method according to claim 6, wherein the providing of the first sublayer, the second sublayer and the first polarizing material layer comprises:
providing a first material sublayer, and stretching the first material sublayer to form the first shrinkage force, the shrinkage direction of the first shrinkage force being parallel to a first direction;
curling the stretched first material sublayer to form a first coil such that an unfolding direction of the first coil is parallel to the first direction, and unfolding and cutting the first coil to provide the first sublayer,
providing a second material sublayer, and stretching the second material sublayer to form the second shrinkage force, the shrinkage direction of the second shrinkage force being parallel to the first direction;
curling the second material sublayer to form a second coil such that an unfolding direction of the second coil is parallel to the first direction, and unfolding and cutting the second coil to provide the second sublayer; and
providing the first polarizing material layer.

8. The method according to claim 7, wherein the first substrate is an array substrate and the second substrate is a color filter substrate; and
the providing of the first polarizing material layer comprises:
providing a first polarizing material film having the absorption axis in a direction parallel to a second direction, the second direction being perpendicular to the first direction; and
curling the first polarizing material film to form a third coil so that an unfolding direction of the third coil is parallel to the first direction, and unfolding and cutting the third coil to provide the first polarizing material layer.

9. A display device comprising a backlight module and a display panel arranged on the backlight module,
wherein the display panel comprises:
a first substrate;
a second substrate disposed opposite to the first substrate;
a liquid crystal layer between the first substrate and the second substrate; and
a first polarizing layer disposed at a side of the first substrate away from the second substrate, the first polarizing layer comprising a first sublayer, a second sublayer, and a first polarizing material layer disposed between the first sublayer and the second sublayer, and
wherein the first sublayer has a first shrinkage force, the second sublayer has a second shrinkage force, and a shrinkage direction of the first shrinkage force is parallel to a shrinkage direction of the second shrinkage force,
wherein the shrinkage direction of the first shrinkage force and the shrinkage direction of the second shrinkage force are perpendicular to a direction of an absorption axis of the first polarizing material layer,
the first sublayer is an optical compensation film and has a slow axis in a direction perpendicular to the direction of the absorption axis of the first polarizing material layer;
wherein the direction of the slow axis of the first sublayer is parallel to the shrinkage direction of the first shrinkage force, and
wherein at 80° C. the first shrinkage force of the first sublayer is less than or equal to 4 N and the second shrinkage force of the second sublayer is less than or equal to 4 N.

10. The display device according to claim 9, wherein a ratio of the first shrinkage force to the second shrinkage force ranges from 19/20 to 21/20.

11. The display device according to claim 9, wherein the first substrate is an array substrate and the second substrate is a color filter substrate; and
the second sublayer is a protective layer disposed at a side of the first sublayer away from the array substrate.

12. The display device according to claim 11, wherein an in-plane phase difference of the first sublayer is less than or equal to 65 nm, and an in-vertical-plane phase difference of the first sublayer ranges from 5 nm to 280 nm.

\* \* \* \* \*